(12) United States Patent
Alasti et al.

(10) Patent No.: US 12,144,029 B2
(45) Date of Patent: Nov. 12, 2024

(54) METHOD AND SYSTEM OF LEASED RADIO UNIT (RU) AND SPECTRUM ARCHITECTURE FOR REDUCING LATENCY IN ACCESS TO OPERATOR RESOURCES

(71) Applicant: DISH Wireless L.L.C., Englewood, CO (US)

(72) Inventors: Mehdi Alasti, Reston, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 357 days.

(21) Appl. No.: 17/649,389

(22) Filed: Jan. 31, 2022

(65) Prior Publication Data
US 2023/0199854 A1    Jun. 22, 2023

Related U.S. Application Data

(60) Provisional application No. 63/265,868, filed on Dec. 22, 2021.

(51) Int. Cl.
*H04W 74/0833* (2024.01)
*H04L 5/00* (2006.01)
*H04W 48/10* (2009.01)
*H04W 84/04* (2009.01)

(52) U.S. Cl.
CPC ....... *H04W 74/0833* (2013.01); *H04L 5/0092* (2013.01); *H04W 48/10* (2013.01); *H04W 84/042* (2013.01)

(58) Field of Classification Search
CPC ............. H04W 74/0833; H04W 48/10; H04W 84/042; H04L 5/0092
See application file for complete search history.

(56) References Cited

U.S. PATENT DOCUMENTS

2019/0380128 A1    12/2019    Park et al.
2021/0092725 A1*    3/2021    Park ........................ H04W 8/08

OTHER PUBLICATIONS

PCT International Search Report for International Application No. PCT/US2022/053563 dated Mar. 30, 2023 (3 pages).
Written Opinion of the International Searching Committee for International Application No. PCT/US2022/043665 dated Mar. 30, 2023 (7 pages).

* cited by examiner

*Primary Examiner* — Justin Y Lee
(74) *Attorney, Agent, or Firm* — KW Law, LLP

(57) ABSTRACT

A system and method for performing a Random Access Channel (RACH) procedure is provided. The method includes configuring a plurality of Bandwidths Parts (BWPs) to one or more Physical Random Access Channel (PRACH) occasions mapped to a public land mobile network identification (PLMN-ID) of a set of different PLMN-IDs, each different PLMN-ID is assigned with at least one operator of a set of operators; assigning each PRACH occasion within an uplink (UL) transmission wherein each PRACH occasion is allocated by the host operator to at least one operator; separating each PRACH occasion of a set of PRACH occasions based on each PLMN-ID of the set of PLMN-IDs; and enabling a User Equipment (UE) operating at a cell site of the RACH procedure via at least one PRACH occasion allocated by the host operator based on the PLMN-ID that has been mapped to subscribers for at least one operator.

19 Claims, 4 Drawing Sheets

METHOD AND SYSTEM OF LEASED RADIO UNIT (RU) AND SPECTRUM ARCHITECTURE FOR REDUCING LATENCY IN ACCESS TO OPERATOR RESOURCES

CROSS-REFERENCE TO RELATED APPLICATIONS

This application claims the benefit of U.S. Provisional Application Ser. No. 63/265,868, filed on Dec. 22, 2021, entitled "METHOD AND SYSTEM OF LEASED RADIO UNIT (RU) AND SPECTRUM ARCHITECTURE FOR REDUCING LATENCY IN ACCESS TO OPERATOR RESOURCES", under 35 U.S.C. §§ 119(e)(1) and 120. The U.S. provisional application is expressly incorporated herein by reference and is incorporated in its entirety.

TECHNICAL FIELD

The following discussion generally relates to network access for wireless communications systems. More particularly, the following discussion relates to systems and processes for reducing latency in access via a number of Physical Random Access Channel (PRACH) occasions with disjoint subsets within an uplink (UL) transmission where each subset of the PRACH occasion is mapped to a Public Land Mobile Network identification (PLMN-ID) of an operator that enables subscriber mapping with associated operators based on the PRACH occasion for directing Random Access Channel Access (RACH) to the UE.

BACKGROUND

With more operators operating at a New Radio (NR) cell site managed by a host operator latency issues for User Equipment (UE), access to Random Access Channel (RACH) procedures can result. In an attempt to overcome related latency issues, changes in RACH procedures in earlier versions of NR 3rd Generation Partnership Project (3GPP) Releases (i.e., Release 15) were defined. For example, the use of one type of RACH procedure (similar to LTE RACH procedure) known as the "4-Step" RACH procedure was reconfigured in Release-16 of the New Radio (NR) version 3GPP with a new "2-Step" RACH procedure to improve the overall latency of the RACH procedure. The 3GPP Radio Access Network (RAN) specified the 2-step RACH procedure for covering both physical layer and higher layer for burst transmission of small packets for reducing the overhead of Radio Resource Control (RRC) connection setup and resumption procedures, and for the New Radio (NR) Unlicensed spectrum (NR-U), reducing the steps of random access to decrease the latency for connecting the User Equipment (UE) to a next-generation Node B (gNB).

Therefore, it is desired to provide additional solutions that reduce network access type latencies with the use of both the 4-step RACH procedure and the new 2-Step RACH procedure based on mapping of bandwidth parts (BWPs) in uplink (UL) transmissions to each operator at a cell site for allocating PRACH occasion per operator so that the subscriber can enable a RACH procedure on the appropriate PRACH occasion allocated to its operator.

It is desired to provide solutions to reduce latencies in access that may occur at the cell site (i.e., the gNB) by broadcasting by the host Radio Unit (RU) a public land mobile network identification (PLMN-ID) and a Physical Random Access Channel (PRACH) occasion with the PLMN-ID on a System Information (SI) message that contains both the PRACH occasion with an associated PLMN-ID to enable the UE access to an allocated PRACH occasion that belongs to the operator that is subscribed for the UE access in an uplink transmission at an NR cell site.

It is desired to provide solutions for enabling User Equipment (UE) RACH procedures to a number of Physical Random Access Channel (PRACH) occasions with the use of disjoint subsets (or bandwidth parts) where each subset is mapped to PLMN-IDs on a specific operator and to map a subscriber to allocated resources of the operator based on the allocated PRACH occasion that belongs to the operator which is broadcast by the host operator.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Figure 1:
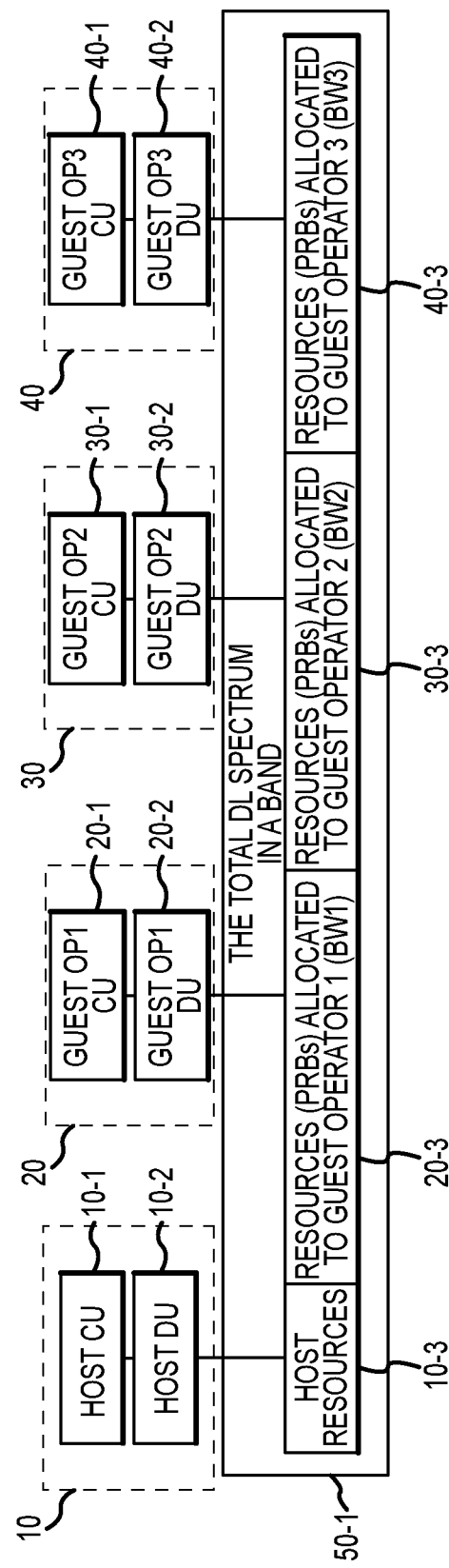
FIG. 1 illustrates an exemplary diagram of the system architecture of a host network with various network operators at the cell site of the access system of the New Radio (NR) network in accordance with various embodiments.

Systems and processes are provided to minimize latency by directing an appropriate PRACH occasion of a subscriber at an NR cell site operated by a host operator.

In an exemplary embodiment, a method of performing a Random Access Channel (RACH) procedure is provided. The method includes configuring, by a host operator, a plurality of Bandwidths Parts (BWPs) to one or more Physical Random Access Channel (PRACH) occasions mapped to a public land mobile network identification (PLMN-ID) of a set of different PLMN-IDs wherein each different PLMN-ID is assigned with at least one operator of a set of operators; assigning, by a distributed unit (DU) of the host operator, each PRACH occasion within an uplink (UL) transmission wherein each PRACH occasion is allocated by the host operator to at least one operator of the set of operators; separating, by the DU of the host operator, each PRACH occasion of a set of PRACH occasions based on each PLMN-ID of the set of PLMN-IDs; and enabling, by the DU of the host operator, a User Equipment (UE) operating at a New Radio (NR) cell site of the RACH procedure via at least one PRACH occasion allocated by the host operator based on the PLMN-ID that has been mapped to subscribers for at least one operator wherein the subscribers include the UE operating at the NR cell site.

In at least one exemplary embodiment, the method includes broadcasting, by the host operator, the PLMN-ID, and the PRACH occasion for each PLMN-ID on a System Information (SI) message at the NR cell site.

In at least one exemplary embodiment, the method includes broadcasting, by the DU of the host operator, the set of PLMN-IDs, and the PRACH occasion associated with each PLMN-ID of the set of different PLMN-IDs associated with at least one operator of the set of operators at the NR cell site.

In at least one exemplary embodiment, the method includes enabling, the RACH procedure by the UE at the NR cell site, via at least one PRACH occasion of at least one operator based on knowledge of at least one PRACH occasion allocated to at least one operator.

In at least one exemplary embodiment, the method includes directly handling, by at least one operator, the RACH procedure by the UE via the DU that belongs to at least one operator or by a separate DU to at least one operator.

In at least one exemplary embodiment, the method includes wherein the host operator is configured with a set of resources to control the set of resources allocated by BWPs among the set of operators at the NR cell site.

In at least one exemplary embodiment, the method includes wherein the set of operators includes the host operator and at least one guest operator.

In at least one exemplary embodiment, the method includes wherein at least one guest operator is configured with a set of DUs and CUs for independent control of allocated resources.

In at least one exemplary embodiment, the method includes wherein control of a set of distributed units (DUs) and control units (CUs) of each guest operator is synchronized to a Radio Unit (RU) controlled by the host operator on both a downlink (DL) transmission and the UL transmission wherein on the DL transmission, the DU of the host operator is configured to broadcast a Synchronization Signal Block (SSB) signal including a Primary Synchronization Signal (PSS) and a Secondary Synchronization Signal (SSS) on a Physical Broadcast Channel (PBCH).

In at least one exemplary embodiment, the method includes wherein the host operator is responsible for the broadcast on the RU of at least a minimum SI message that includes a Master Information Block (MIB) data for the UE to acquire time and frequency synchronization with the cell site, and to detect a Physical layer Cell ID (PCI) of the cell site with System Information Block (SIB) type data that can contain access baring data.

In at least one exemplary embodiment, the method includes wherein the DL transmission includes a band of total shared RU resources of host resources, and resources allocated to the at least one guest operator wherein at least one guest operator leases an allocated set of resources in a shared RU resource set configured by the host operator.

In another exemplary embodiment, an access system to reduce the duration to identify a public land mobile network (PLMN) for associating with a User Equipment (UE) of an operator at a New Radio (NR) cell site during a Random Access Channel (RACH) process is provided. The system includes a host operator operating at the NR cell site to: configure, by a host operator, a set of Bandwidths Parts (BWPs) by associating one or more Physical Random Access Channel (PRACH) occasions mapped to a public land mobile network identification (PLMN-ID) of a set of different PLMN-IDs wherein each different PLMN-ID is assigned with at least one operator of a set of operators; assign, by a distributed unit (DU) of the host operator, each PRACH occasion within an uplink (UL) transmission wherein each PRACH occasion is allocated by the host operator to at least one operator of the set of operators; separate, by the DU of the host operator, each PRACH occasion of a set of PRACH occasions based on each PLMN-ID of the set of PLMN-IDs; and enable, by the DU of the host operator, the UE operating at the NR cell site of the RACH procedure on at least one PRACH occasion allocated by the host operator based on the PLMN-ID that has been mapped to subscribers for at least one operator wherein the subscribers include the UE operating at the NR cell site.

In at least one exemplary embodiment, the system includes wherein the host operator is configured to broadcast the PLMN-ID and the PRACH occasion for each PLMN-ID on a System Information (SI) message at the NR cell site.

In at least one exemplary embodiment, the system includes wherein the host operator is configured to enable the RACH procedure by the UE at the NR cell site, via at least one PRACH occasion of at least one operator based on knowledge of at least one PRACH occasion allocated to the at least one operator.

In at least one exemplary embodiment, the system includes wherein the host operator is configured to enable the RACH procedure by the UE at the NR cell site, via the at least one PRACH occasion of at least one operator based on knowledge of at least one PRACH occasion allocation to the at one operator.

In at least one exemplary embodiment, the system includes wherein the DU of the host operator is configured to allow direct handling of the RACH procedure by the UE via the DU that belongs to at least one operator or by a separate DU to at least one operator.

In at least one exemplary embodiment, the system includes wherein the host operator is configured with a set of resources to control a set of resources allocated by BWPs among the set of operators at the NR cell site.

In at least one exemplary embodiment, the system includes wherein the set of operators includes the host operator and at least one guest operator.

In at least one exemplary embodiment, the system includes wherein at least one guest operator is configured with a set of DUs and CUs for independent control of allocated resources.

In at least one exemplary embodiment, the system includes wherein control of a set of distributed units (DUs) and control units (CUs) of each guest operator is synchronized to a Radio Unit (RU) controlled by the host operator on both a downlink (DL) transmission and the UL transmission wherein on the DL transmission, the DU of the host operator is configured to broadcast a Synchronization Signal Block (SSB) signal including a Primary Synchronization Signal (PSS) and a Secondary Synchronization Signal (SSS) on a Physical Broadcast Channel (PBCH).

DETAILED DESCRIPTION

The following detailed description is intended to provide several examples that will illustrate the broader concepts that are set forth herein, but it is not intended to limit the invention or the application and uses of the invention.

Furthermore, there is no intention to be bound by any theory presented in the preceding background or the following detailed description.

Wireless mobile communication technology uses various standards and protocols to transmit data between a base transceiver station (BTS) and a wireless mobile device. 5G is the fifth-generation cellular network technology. After initial delivery in late 2017 of 'Non-Stand-Alone' (NSA) NR new radio specifications for 5G, much effort focused in 2018 on timely completion of 3GPP Release 15—the first full set of 5G standards. The industry association 3GPP defines any system using "5G NR" (5G New Radio) software as "5G", a definition that came into general use by late 2018. 5G NR follows 2G, 3G, and 4G and their respective associated technologies (such as GSM, UMTS, LTE, LTE Advanced Pro, and others). In 3GPP radio access networks (RANs) in LTE systems, the BTS can be a combination of evolved Node Bs (also commonly denoted as enhanced Node Bs, eNodeBs, or eNBs) and Radio Network Central units (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

Cell search is the procedure for a UE to acquire time and frequency synchronization with a cell and to detect the Physical layer Cell ID (PCI) of the cell. During cell search operations which are carried out when a UE is powered ON, mobility in connected mode, idle mode mobility (e.g., reselections), inter-RAT mobility to NR system, etc., the UE uses New Radio (NR) synchronization signals and PBCH to derive the necessary information required to access the cell. Similar to a Long-Term Evolution (LTE) standard, two types of synchronization signals are defined for NR; Primary Synchronization Signal (PSS) and the Secondary Synchronization Signal (SSS). The Synchronization Signal/PBCH block (SSB) consists of PSS, SSS, and Physical Broadcast Channel (PBCH).

A drawback of the current cell search procedure in LTE is that the UE needs to first decode PBCH/MIB for it to receive other system information transmitted on PDSCH. However, the overall functionality and structure of MIB/SIB of NR are almost the same as LTE, but there is at least one major difference between NR and LTE. In LTE (and in all other LTE technologies (i.e., 3.95G, 4G LTE, etc.) except NR), all the SIBs are broadcast periodically regardless of whether UE wants it or not. However, in NR there are two different types of SIBs. One type is the one being transmitted periodically like SIBs in LTE and the other type is the one being transmitted only when there is a request from UE.

The 3rd Generation Partnership Project (3GPP) finalized release 15 specifications for the 5th Generation New Radio (5G NR) in June 2018. In Release 16, the 3GPP worked on not only technical improvements over the previous release but also as mentioned the introduction of new features. One of the new features is the use of a Two-step Random Access Channel (2-step RACH) that enhances 4-step random access to radio resource control connection setup and resume procedures. The drawback of the 2-step Contention-Based Random Access (CBRA), particularly with multiple guests operating at an NR cell site, is that the UEs of each guest must compete for channel access and request channel access; this can result in latency in channel access connectivity.

Embodiments of the present disclosure describe methods and system of processes to reduce the duration of a host operator or network for RACH procedure by prior informing the host operator or network of the PLMN-ID that an attaching UE is associated with in both or either the 2-step RACH and 4-Step RACH procedures by broadcasting System Information (SI) messages or minimum SI messages with PLMN-ID information for prior mapping of PLMN-ID with a RACH for connection by the UE. The RACH is made available to UEs of multiple guest operators broadcast PRACH occasions by the host at the NR cell site. The PLMN-ID information has already been assigned by the host operator to each guest operator of a set of multiple guest operators operating at the NR cell site and is also mapped to each RACH occasion for a particular guest operator. The PLMN-ID for associating the UE with a PRACH occasion of its operator broadcast by the host operator at an NR cell site.

In various exemplary embodiments, the various guest operators are allocated access to Bandwidth parts in a spectrum in the uplink transmission, and a guest operator is assigned at least a Physical Random Access Channel (PRACH) occasion mapped to the PLMN-ID on a System Information (SI) message (or minimum SI message) that contains both the PRACH occasion with an associated PLMN-ID to enable the guest operator to access the appropriate PRACH occasion that is broadcast.

In reference to FIG. 1, FIG. 1 illustrates an exemplary diagram of the system architecture of a host network with various guest networks operating at the cell site of the managing guest access system of the New Radio (NR) network in accordance with various embodiments. In FIG. 1, the network system 100 includes control units and distributed units of the host and guest networks operating in a total spectrum at a cell site. In embodiments, the guest networks may be operating at the same spectrum at a cell site.

The network system is a New Radio (NR) system that includes a host operator 10 that is configured with a host control unit 10-1, and host distribution unit 10-2, a first guest operator (or first network operator) 20 that is configured with a first guest control unit 20-1, and a first guest distribution unit 20-2. Also included are other guest operators operating at a cell site that include a second guest operator 30 that is configured similarly with a second guest control unit 30-1, and a second guest distributed unit 30-2. Also included are third guest operator 40, with a third guest control unit 40-1, and a fourth guest distributed unit 40-2. Further, the host operator 10 and the various guest operators (20, 30, 40) share the total spectrum (i.e., same spectrum) that is available at the NR cell site that includes the total downlink (DL) spectrum 50-1 that includes the host resources 10-3, the resources (PRBs) allocated to first guest operator "1" (BW1) 20-3, the resources (PRBs) allocated to second guest operator "2" (BW2) 30-3, the resources (PRBs) allocated to third guest operator "3" (BW1) 40-3.

In exemplary embodiments, the host operator 10 owns or manages the Radio Unit (RU) that is shared among the host operator 10 and all the guest operators (20, 30, 40) at the cell site. The bandwidth that is allocated for each of the operators is agreed upon (per an SLA) or other agreement and configured using 5G Bandwidth Parts (BWPs). Each operator owns (controls independently) its set of distributed units (DUs) and central units (CUs). The host operator's distributed unit (DU) and central unit (CU) are synchronized to the Radio Unit (RU) owned by the host operator 10 on both the uplink (UL) transmission and downlink (DL) transmission.

The System information (SI) (or minimum System Information) is broadcast over the cell site. In the case of NR, the minimum SI carries the basic information that is required for initial access and for acquiring any other SI. The Minimum SI consists of MIB and SIB 1 for the UE to be allowed to camp on the cell it must acquire the contents for the minimum SI. The SIB 1 carries the most critical information required for the UE to access the cell e.g., random access parameters. SIB1 also indicates whether one or more SIB s are only provided on-demand, in which case, it may also provide the PRACH configuration needed by the UE to request for the required SI.

The SIB2 contains the cell re-selection information that is mainly related to the serving cell, the SIB3 contains information about the serving frequency and intra-frequency neighboring cells relevant for cell re-selection (including cell re-selection parameters common for a frequency as well as cell-specific re-selection parameters).

In embodiments, the host operator allocates subsets of the total spectrum 50-3 in the band that consists of a set of Bandwidths Parts (BWPs) assigned to the guest operators. Also, the host operator maps at least a Physical Random Access Channel (PRACH) occasion to each guest operator in the same spectrum. Each of the BWPs of the same spectrum is mapped by the host operator 10 to a public land mobile network identification (PLMN-ID) of a set of different PLMN-IDs for each operator that is operating the total spectrum to enable User Equipment of subscriber to access after the network attach process. Each different PLMN-ID is assigned to a different operator (i.e., the guest operators and the host). As a result, each PRACH occasion (for the different operators) within an uplink (UL) transmission. The DU 10-2 of the host operator 10 separates a number of PRACH occasions based on the PLMN-ID that allows the UE at the NR cell site to enable the RACH procedure based on the PRACH occasion allocated by the PLMN-ID mapped to subscribers.

Figure 2:
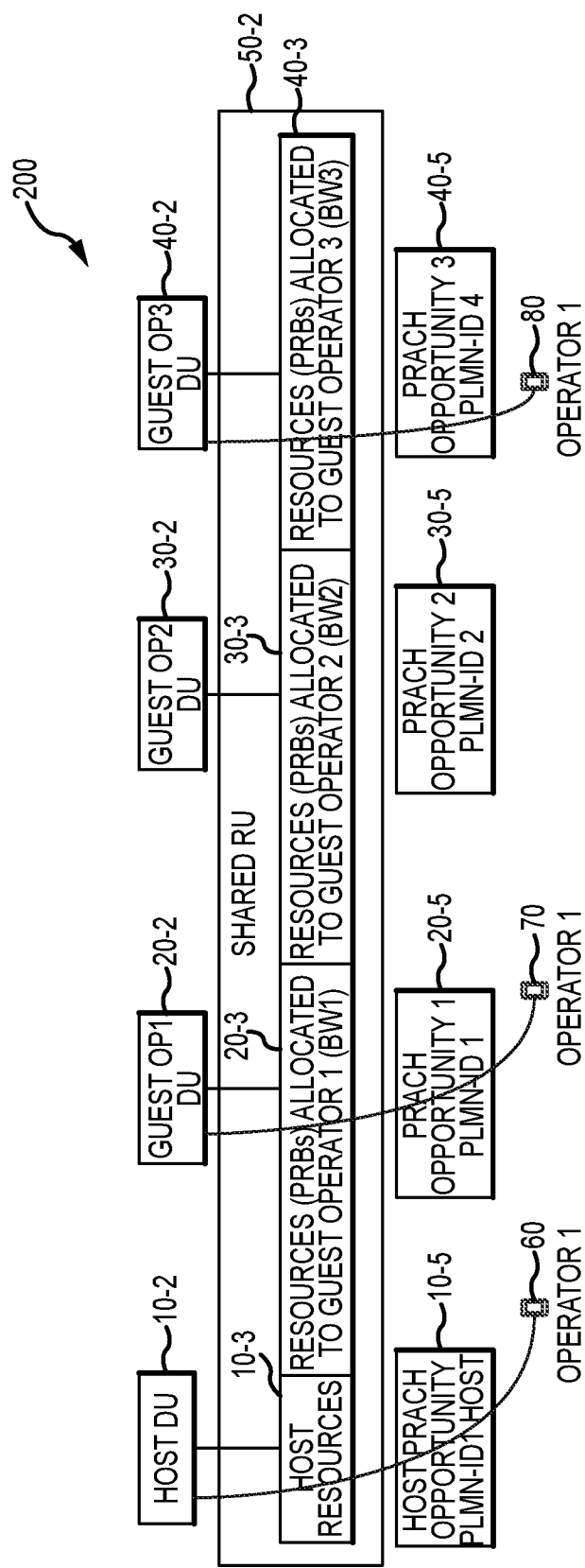
FIG. 2 illustrates an exemplary diagram of the shared radio unit (RU) bandwidth part (BWP) architecture of a host network with various guest networks operating at the cell site of the access system of the New Radio (NR) network in accordance with various embodiments.

In reference to FIG. 2, FIG. 2 illustrates an exemplary diagram of the shared radio unit (RU) bandwidth part architecture of a host network with various guest networks operating at the cell site of the access system of the New Radio (NR) network in accordance with various embodiments. In FIG. 2, the host operator 10 (i.e., operator "1" that owns the NR site) broadcasts in the shared RU 50-2 spectrum, a public land mobile network identification (PLMN-ID) and a Physical Random Access Channel (PRACH) occasion with the PLMN-ID on a System Information (SI) message at the NR cell site. The host operator 10 broadcasts on the host resources 10-2 via its own distributed unit (DU) that it is allocated on the shared RU 50-2 resources, the PLMN-IDs, and the PRACH occasion for each PLMN-ID on the SI message. The SI message contains both the PRACH occasion with an associated PLMN-ID. Further, each PRACH occasion can be assigned with the uplink (UL) Bandwidth Part (BWP) that is allocated to the appropriate guest operators (i.e., the multiple guest operators) operating the NR cell site. In this case, there is illustrated the UE request for channel access to be checked with operator "1" of request 60, operator "2" of request 70, and operator "3" or request 80 for channel access.

In embodiments, each guest operator "1", "2", "3", and "4" has its own distributed unit (DU) that uses resources (PRBs) allocated in the shared RU 50-2 resources to its operations. For example, resources (PRBs) 20-3 are allocated to the first guest operator "1" 20 (in FIG. 1) coupled to the first guest operator "1" distributed unit 20-2; resources (PRBs) 30-3 are allocated to the second guest operator "2" 30 (in FIG. 2) coupled to the second guest operator "2" distributed unit 30-2, and resources (PRBs) 40-3 are allocated to the third guest operator "3" (in FIG. 3) coupled to the third guest operator "3" distributed unit 40-2.

In embodiments, since the access system 200 allocates separate PRACH occasions to different PLMN-IDs (the PLMN-IDs) which belong to different guest operators (20, 30, 40), a UE will RACH on the appropriate PRACH occasion allocated to its operator. In this case, the UE has RACH on the PRACH occasion "2" with the "PLMN-ID 2" based on the bandwidth part 2 (i.e., the UE is associated with the third guest operator "3" which had been assigned PLMN-ID 2).

In embodiments, in FIG. 2, the host operator 10 is shown with a Host PRACH occasion with the "PLMN-ID host" 10-5. The access system 200 knows at the time of the request on PRACH by the UE to connect on the RACH which guest operator is to connect or have access by the allocated BWP on the shared RU 50-2 that corresponds to an appropriate PRACH occasion (i.e., in the preamble of the PRACH occasion). Hence, the access system 200 knows which guest operator the UE belongs to at the offset of the request to connect, and the RACH may be handled by the DU of the appropriate operator.

Figure 3:
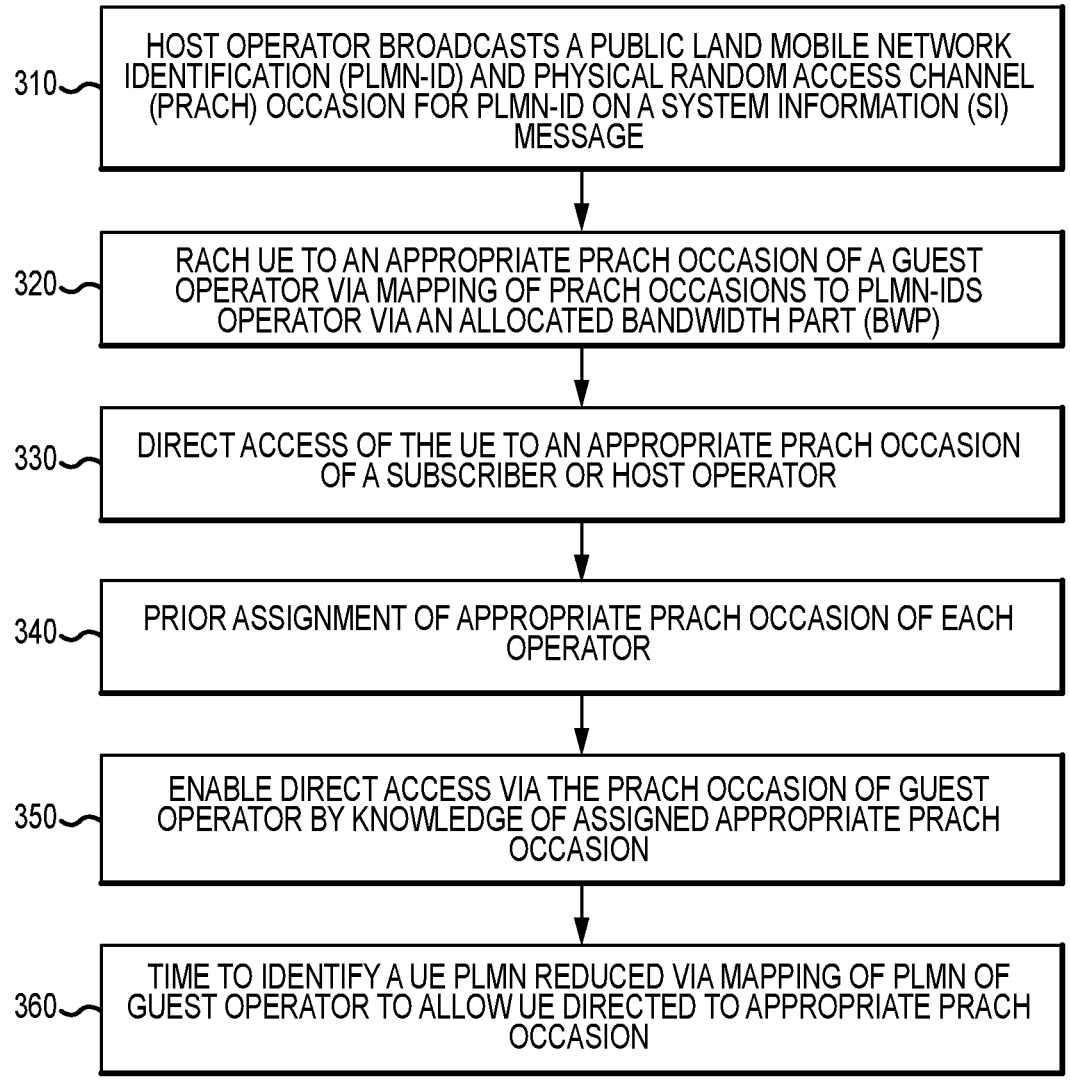
FIG. 3 illustrates an exemplary diagram of the shared radio unit (RU) bandwidth part architecture of a host network with various guest networks operating at the cell site of the access system of the New Radio (NR) network in accordance with various embodiments.

In reference to FIG. 3, FIG. 3 illustrates an exemplary diagram of the shared radio unit (RU) bandwidth part architecture of a host network with various guest networks operating at the cell site of the access system of the New Radio (NR) network in accordance with various embodiments. In FIG. 3 the steps are illustrated for reducing time or duration to identify the PLMN a UE belongs to during the attach process by User Equipment (UE) of multiple guest operators managed by a host operator at a cell site. In embodiments, the host operator is prior informed which PLMN an attaching UE is associated with during the random access (RACH) process. At step 310, the host operator is configured with a processor (of the access system) programmed with instructions that control a new radio transmitter that broadcasts a public land mobile network identification (PLMN-ID) and a Physical Random Access Channel (PRACH) occasion for each PLMN-ID on a System Information (SI) message at the NR cell site. Next, at step 320, the processor is configured by the host operator enabling access of subsets of shared Radio Unit (RU) resources to subscribers at the NR cell site. For example, a UE of a subscriber when executing a RACH procedure with a PRACH occasion within a UL transmission by the transmitter of the shared RU at the NR cell site will RACH on the appropriate PRACH occasion that it is assigned based on the PLMN-ID linked with the UE. Hence, several PRACH occasions are transmitted within a UL transmit, and the appropriate or right PRACH occasion will be known by the UE to RACH based on the PLMN-ID of the UE and its allocated BWP to operate in the total spectrum where multiple subscribers are also operating. At 330, the control unit and the distributed unit of the host operator know which UE is assigned to which BWP of several PRACH occasions configured in the UL transmission. The access is provided, mapping BWPs of the total spectrum to each PLMN-ID and enabling access to the UE with the PLMN-ID that corresponds to the appropriate PRACH occasion for which the subscriber is linked. In implementations, the PRACH occasion is expected on the same BWP assigned to the PLMN but is not a requirement when mapping one or more PRACH occasions to the PLMN-ID.

At step 340, prior to the RACH by the UE to an (i.e., the guest operator) operator network, each PRACH occasion allocated to the operator is assigned by the host operator. Hence, the DU of the host separates each PRACH occasion based on each PLMN-ID and knows which UE can be provided with the right PRACH occasion. At step 350, in response to the RACH by the UE at the cell site, because the PRACH occasion is already allocated for access to the UE belonging to a PLMN-ID, the UE can RACH to the subscriber network. In this case, each guest operator may handle its subscriber UE RACH by its individual DU that belongs each guest operator can independently control. The host operator allocates resources in each BWP for each guest operator to allow its UE operations.

At step 360, the result is the time or duration to identify a UE's PLMN is reduced via mapping of the PRACH occasions to PLMN-IDs per guest operator to allow the UE to access the appropriate PRACH occasion of the number of PRACH occasions in the UL transmission without further exchange of information with the host/guest operator. Each guest operator is configured with a set of DUs and CUs that is controlled by each guest operator independently for the allocated resources. The control of a set of distributed units (DUs) and control units (CUs) of each guest operator is synchronized to the Radio Unit (RU) controlled by the host operator on both a downlink (DL) transmission and the uplink (UL) transmission. The DL transmission is configured to broadcast a Synchronization Signal Block (SSB) signal including a Primary Synchronization Signal (PSS) and a Secondary Synchronization Signal (SSS) on a Physical Broadcast Channel (PBCH). The host operator is responsible for the broadcast on the RU of at least a minimum SI message including a Master Information Block (MIB) data for the UE to acquire time and frequency synchronization with the cell site, and to detect a Physical layer Cell ID (PCI) of the cell site with System Information Block (SIB) type data that can contain access baring data. The DL transmission is configured to include subsets of total shared RU resources of host resources, and resources allocated to guest operators.

Figure 4:
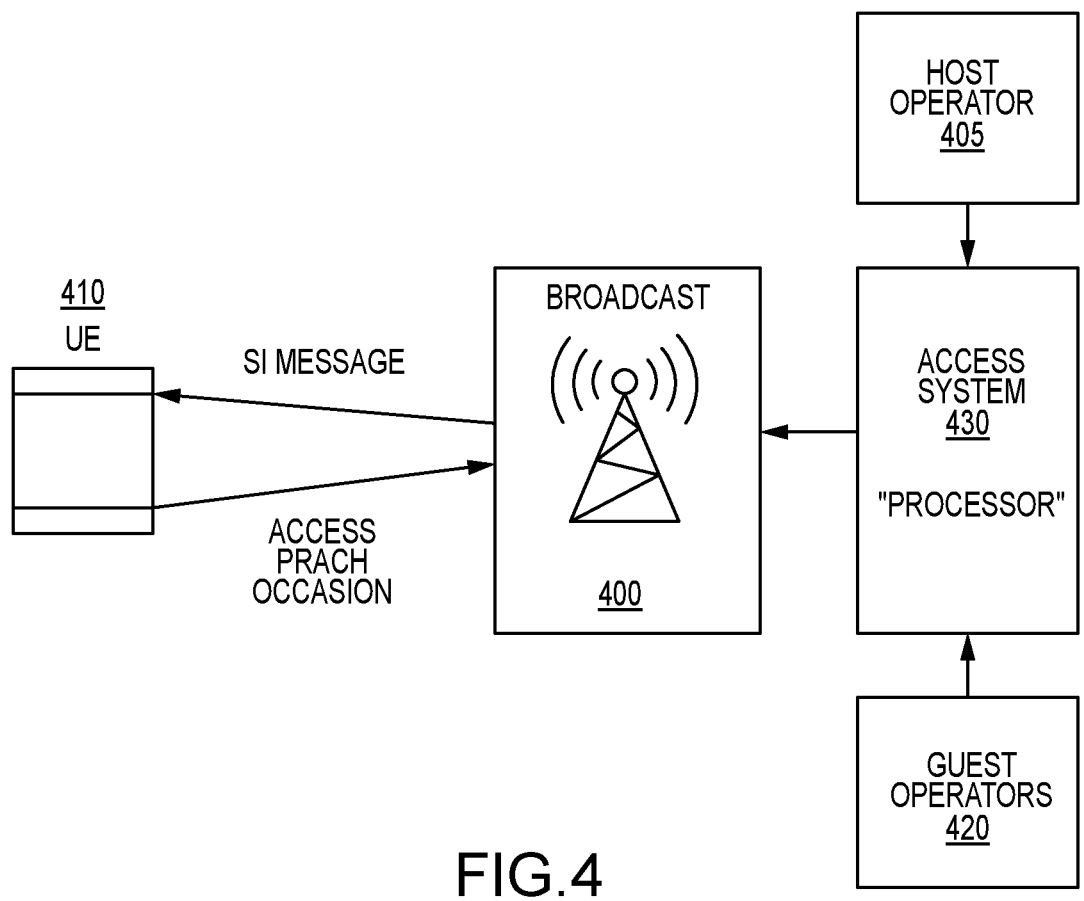
FIG. 4 illustrates an exemplary diagram of the radio unit of a host operator broadcasting uplink transmission for operator access of subscribers at a New Radio cell site of the access system in accordance with various embodiments.

In reference to FIG. 4, FIG. 4 illustrates an exemplary diagram of the radio unit of a host operator 405 broadcasting uplink transmission for a PRACH occasion allocated for each different subscriber at a New Radio (NR) 400 at a cell site of the access system 430 in accordance with various embodiments. In FIG. 4, the host operator 405 via instructed processors of the access system 430 broadcasts a public land mobile network identification (PLMN-ID) and a Physical Random Access Channel (PRACH) occasion for each PLMN-ID on a System Information (SI) message via the NR 400 at the cell site.

The UE 410 is enabled for a RACH procedure of a PRACH occasion in a UL transmission by the host operator (from a broadcast). Each PRACH occasion is configured in a shared RU of an allocated set of resources that have been assigned as instructed by processors of the access system 430 in the same operating spectrum for multiple operators 420. The multiple operators 420 are configured as instructed by the processor of the access system 430 controlled by the host operator 405 with different PRACH occasions allocated with assigned PLMN-IDs to enable the UE 410 access to an appropriate PRACH occasion of a subscriber by mapping a PRACH occasion to the PLMN-ID of its operator. The access is provided to the User Equipment (UE) 410 to a single PRACH occasion of several different PRACH occasions within an uplink (UL) transmission were each different PRACH occasion mapped to the UE 410 operator PLMN-ID for subscriber access at the NR 400 cell site (i.e., the specific guest operator from the multiple guest operators 420).

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

As described, the UE access system includes several processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A method of performing a Random Access Channel (RACH) procedure, comprising:
mapping, by a host operator, each of a plurality of Bandwidths Parts (BWPs) available from each of a plurality of distributed units (DUs) operated by the host operator to one of a plurality of public land mobile network identifications (PLMN-IDs), wherein each of the plurality of PLMN-IDs is associated with at least one operator of a set of different operators;
associating, by the host operator, each of the PLMN-IDs with a different physical random access channel (PRACH) occasion, wherein each PRACH occasion is available from at least one of the DUs for uplink (UL) transmission from user equipment (UE) associated with the PLMN-ID of the PRACH;
identifying, by each of the DUs of the host operator, each PRACH occasion available from the DU based on each PLMN-ID of the set of PLMN-IDs; and
enabling, by the DU of the host operator, a User Equipment (UE) to access a New Radio (NR) cell site using the PRACH occasion associated with the PLMN-ID that is associated with the UE, and to thereafter communicate with the NR cell cite via the BWPs that are allocated to the operator associated with the PLMN-ID of the PRACH.

2. The method of claim 1, wherein the identifying comprises broadcasting, by the host operator, the PLMN-ID, and the PRACH occasion for each PLMN-ID on a System Information (SI) message at the NR cell site.

3. The method of claim 2, wherein the identifying comprises broadcasting, by the DU of the host operator, the set of PLMN-IDs, and the PRACH occasion associated with each PLMN-ID of the set of different PLMN-IDs associated with at least one operator of the set of operators at the NR cell site.

4. The method of claim 3, wherein the enabling comprises a RACH procedure by the UE at the NR cell site via the PRACH occasion associated with the PLMN-ID that is associated with the UE.

5. The method of claim 4, further comprising:
directly handling, by the at least one operator, the RACH procedure by the UE via the DU that belongs to the at least one operator or by a separate DU to the at least one operator.

6. The method of claim 5, further comprising:
wherein the host operator is configured with a set of resources to control the set of resources allocated by BWPs among the set of operators at the NR cell site.

7. The method of claim 6, further comprising:
wherein the set of operators comprises the host operator and at least one guest operator that is separate from the host operator.

8. The method of claim 7, further comprising:
wherein the at least one guest operator is configured with a dedicated set of DUs and CUs for independent control of resources allocated to the at least one guest operator.

9. The method of claim 8, further comprising:
wherein control of a set of distributed units (DUs) and control units (CUs) of each guest operator is synchronized to a Radio Unit (RU) controlled by the host operator on both a downlink (DL) transmission and the UL transmission wherein on the DL transmission, the DU of the host operator is configured to broadcast a Synchronization Signal Block (SSB) signal comprising a Primary Synchronization Signal (PSS) and a Secondary Synchronization Signal (SSS) on a Physical Broadcast Channel (PBCH).

10. The method of claim 9, further comprising:
wherein the host operator is responsible for the broadcast on the RU of at least a minimum SI message that comprises a Master Information Block (MIB) data for the UE to acquire time and frequency synchronization with the cell site, and to detect a Physical layer Cell ID (PCI) of the cell site with System Information Block (SIB) type data that can contain access baring data.

11. The method of claim 10, further comprising:
wherein the DL transmission comprises a band of total shared RU resources of host resources, and resources allocated to the at least one guest operator wherein at least one guest operator leases an allocated set of resources in a shared RU resource set configured by the host operator.

12. An access system to reduce a duration to identify a public land mobile network (PLMN) for associating with a User Equipment (UE) of an operator at a New Radio (NR) cell site during a Random Access Channel (RACH) process, comprising:
a host operator operating at the NR cell site to:
map, by the host operator, each of a plurality of Bandwidths Parts (BWPs) available from each of a plurality of distributed units (DUs) operated by the host operator to one of a plurality of public land mobile network identifications (PLMN-IDs), wherein each of the plurality of PLMN-IDs is associated with at least one operator of a set of different operators;
associate, by the host operator, each of the PLMN-IDs with a different physical random access channel (PRACH) occasion, wherein each PRACH occasion is available from at least one of the DUs for uplink (UL) transmission from user equipment (UE) associated with the PLMN-ID of the PRACH;
identify, by each of the DUs of the host operator, each PRACH occasion available from the DU based on each PLMN-ID of the set of PLMN-IDs; and
enable, by the DU of the host operator, a User Equipment (UE) to access a New Radio (NR) cell site using the PRACH occasion associated with the PLMN-ID that is associated with the UE, and to thereafter communicate with the cell cite via the BWPs that are allocated to the operator associated with the PLMN-ID of the PRACH.

13. The system of claim 12, further comprising:
wherein the host operator is configured to:
broadcast the PLMN-IDs and the PRACH occasions for each of the plurality of PLMN-IDs on a System Information (SI) message at the NR cell site.

14. The system of claim 13, further comprising:
wherein the host operator is configured to:
enable RACH procedure by the UE at the NR cell site via the PRACH occasion associated with the PLMN-ID that is associated with the UE.

15. The system of claim 14, wherein the DU of the host operator is configured to allow direct handling of the RACH procedure by the UE via the DU that belongs to the at least one operator or by a separate DU to the at least one operator.

16. The system of claim 15, further comprising:
wherein the host operator is configured to allocate the BWPs among the set of operators at the NR cell site.

17. The system of claim 16, further comprising:
wherein the set of operators comprises the host operator and at least one guest operator that is different from the host operator.

18. The system of claim 17, further comprising:
wherein the at least one guest operator is configured with a dedicated set of DUs and CUs for independent control of resources allocated to the at least one guest operator.

19. The system of claim 18, further comprising:
wherein control of a set of distributed units (DUs) and control units (CUs) of each guest operator is synchronized to a Radio Unit (RU) controlled by the host operator on both a downlink (DL) transmission and the UL transmission wherein on the DL transmission, the DU of the host operator is configured to broadcast a Synchronization Signal Block (SSB) signal comprising a Primary Synchronization Signal (PSS) and a Secondary Synchronization Signal (SSS) on a Physical Broadcast Channel (PBCH).

* * * * *